(12) United States Patent
Jang

(10) Patent No.: US 7,595,785 B2
(45) Date of Patent: Sep. 29, 2009

(54) DISPLAY DEVICE AND DRIVING DEVICE FOR A LIGHT SOURCE

(75) Inventor: Hyeon-Yong Jang, Osan-si (KR)

(73) Assignee: Samsung Electronics Co., Ltd. (KR)

( * ) Notice: Subject to any disclaimer, the term of this patent is extended or adjusted under 35 U.S.C. 154(b) by 689 days.

(21) Appl. No.: 11/187,480

(22) Filed: Jul. 22, 2005

(65) Prior Publication Data

US 2006/0017404 A1 Jan. 26, 2006

(30) Foreign Application Priority Data

Jul. 22, 2004 (KR) .................. 10-2004-0057127

(51) Int. Cl.
G09G 3/36 (2006.01)
(52) U.S. Cl. .................. 345/102; 315/291
(58) Field of Classification Search .......... 345/102, 345/101; 315/291, 307, 308
See application file for complete search history.

(56) References Cited

U.S. PATENT DOCUMENTS

| | | | |
|---|---|---|---|
| 5,907,742 A | 5/1999 | Johnson | |
| 6,066,920 A | 5/2000 | Torihara | |
| 6,198,234 B1 * | 3/2001 | Henry | 315/291 |
| 6,288,388 B1 * | 9/2001 | Zhang et al. | 250/214.1 |
| 6,388,388 B1 * | 5/2002 | Weindorf et al. | 315/169.3 |
| 6,713,744 B1 | 3/2004 | Kubo | |
| 7,075,596 B2 * | 7/2006 | Hosoda | 349/72 |
| 7,183,727 B2 * | 2/2007 | Ferguson et al. | 315/308 |
| 2002/0109467 A1 * | 8/2002 | Ito et al. | 315/291 |
| 2002/0130786 A1 * | 9/2002 | Weindorf | 340/815.45 |
| 2003/0011326 A1 * | 1/2003 | Noh | 315/291 |
| 2003/0043106 A1 * | 3/2003 | Woo | 345/101 |
| 2004/0130521 A1 * | 7/2004 | Kim | 345/102 |
| 2004/0246226 A1 * | 12/2004 | Moon | 345/102 |

FOREIGN PATENT DOCUMENTS

| | | |
|---|---|---|
| CN | 1499248 | 5/2004 |
| JP | 07211468 | 8/1995 |
| JP | 07272881 | 10/1995 |
| JP | 10104571 | 4/1998 |
| JP | 10148808 | 6/1998 |
| JP | 10189259 | 7/1998 |

(Continued)

Primary Examiner—Richard Hjerpe
Assistant Examiner—Carolyn R Edwards
(74) Attorney, Agent, or Firm—Cantor Colburn, LLP

(57) ABSTRACT

A light source portion for a liquid crystal display (LCD) device may prevent reduction of the life span of the multiple lamps (LPs) when a surrounding temperature of the multiple LPs is less than a predetermined temperature of the LCD device. The LCD device comprises first and second brightness control portions receiving a brightness control signal, a temperature sensor, a signal output portion connected to the first and second brightness control portions and the temperature sensor, and an inverter portion turning on or turning off the multiple LPs based on the control signal from the signal output portion. When the temperature sensed by the temperature sensor is less than the predetermined temperature of the LCD device, the signal output portion switches the brightness control signal from a high level to a low level, and makes the multiple LPs maintain the high level until the surrounding temperature becomes more than the predetermined temperature.

19 Claims, 5 Drawing Sheets

FOREIGN PATENT DOCUMENTS

| | | |
|---|---|---|
| JP | 2000150191 | 5/2000 |
| JP | 2001169273 | 6/2001 |
| JP | 2002311413 | 10/2002 |
| JP | 2003-045693 | 2/2003 |
| KR | 1020020017358 | 3/2002 |
| KR | 100361192 | 4/2002 |
| KR | 1020030084451 | 11/2003 |
| KR | 1020040006304 | 1/2004 |

* cited by examiner

DISPLAY DEVICE AND DRIVING DEVICE FOR A LIGHT SOURCE

This application relies for priority upon Korean Patent Application No. 2004-0057127 filed on Jul. 22, 2004, the contents of which are herein incorporated by reference in its entirety.

BACKGROUND OF THE INVENTION

1. Field of the Invention

The present invention relates to display devices, and more particularly, to a display device and a driving device for a light source.

2. Description of the Related Art

Display devices comprise light emitting diodes (LEDs), electroluminescences (ELs), vacuum fluorescent displays (VFDs), filed emission displays (FEDs), plasma display panels (PDPs), and liquid crystal displays (LCDs), for example. The LCDs comprise two display substrates (e.g. a lower display substrate for thin film transistors (TFTs) and an upper display substrate for color filters), a liquid crystal layer disposed between the two display substrates and having dielectric anisotropy, and a backlight assembly having a light source and a driving device for the light source.

The backlight assembly for the LCDs comprises multiple cold cathode fluorescent lamps (CCFLs) or multiple external electrode fluorescent lamps (EEFLs), for example, and at least one inverter for driving the multiple CCFLs or the multiple EEFLs. The at least one inverter converts a DC power, which is applied in response to a brightness control signal applied from an external source, into an AC power; applies the AC power to the multiple CCFLs or EEFLs; and controls the brightness of the multiple CCFLs or EEFLs. Further, the at least one inverter detects voltages relating to electric currents of the multiple CCFLs or EEFLs and controls input voltages to be applied to the multiple CCFLs or EEFLs in response to the detected voltages.

When a surrounding temperature of the LCDs is less than a predetermined temperature of the LCDs, gases (e.g. mercury, etc.) in each discharging tube of the multiple CCFLs or EEFLs are converted into a liquid phase and thus some gases of each discharging tube are not excited and a desired brightness is not generated. Additionally, the life span of the multiple CCFLs or EEFLs is shortened, for the gases converted into a liquid phase erode electrodes of the multiple CCFLs or EEFLs.

SUMMARY OF THE INVENTION

The present invention provides a driving device for at least one light source comprising a temperature sensor operable for sensing a surrounding temperature of the light source and outputting a first control signal in response to the sensed temperature; a signal output portion operable for receiving a second control signal based on a first brightness control signal applied from an external source; changing the second control signal based on the first control signal; and outputting the changed second control signal; and an inverter controller operable for receiving the changed second control signal and outputting a third control signal based on the changed second control signal.

In exemplary embodiments, the present invention provides a driving device for at least one light source comprising a temperature sensor, the temperature sensor operable for sensing a surrounding temperature of the light source and outputting a first control signal in response to the sensed temperature; a first brightness control portion, the first brightness control portion operable for outputting the first control signal based on a first brightness control signal applied from an external source; a signal output portion, the signal output portion operable for receiving a second control signal based on the first brightness control signal; changing the second control signal based on the first control signal; and outputting the changed second control signal; an inverter controller, the inverter controller operable for receiving the changed second control signal and outputting a third control signal based on the changed second control signal; a second brightness control portion, the second brightness control portion operable for generating an output signal based on a second brightness control signal; and an electric current sensor operable for sensing an electric current of at least one lamp and outputting a corresponding voltage in response to the sensed electric current.

In exemplary embodiments, the present invention provides a display device comprising a display portion, the display portion comprising a display assembly, multiple data and gate tape carrier packages (TCPS) attached to the display assembly, and data and gate printed circuit boards attached to the corresponding data and gate TCPs; and a backlight assembly, the backlight assembly comprising a light source portion having at least one light source, an optical portion disposed between the display assembly and the light source portion for adjusting amount of light from the light source portion, and an inverter portion operable for controlling operation of the light source portion; wherein the inverter portion comprises a temperature sensor operable for sensing a surrounding temperature of the light source and outputting a first control signal in response to the sensed temperature; a signal output portion operable for receiving a second control signal based on a first brightness control signal applied from an external source; changing the second control signal based on the first control signal; and outputting the changed second control signal; and an inverter controller operable for receiving the changed second control signal and outputting a third control signal based on the changed second control signal.

These and other objects, features and advantages of the present invention will become apparent from the following detailed description of embodiments thereof, which is to be read in connection with the accompanying drawings.

BRIEF DESCRIPTION OF THE DRAWINGS

The above and other features and advantage points of the present invention will become more apparent by describing in detailed embodiments thereof with reference to the accompanying drawings, in which.

DETAILED DESCRIPTION OF THE INVENTION

Hereinafter the embodiments of the present invention will be described in detail with reference to the accompanied drawings.

Figure 1:
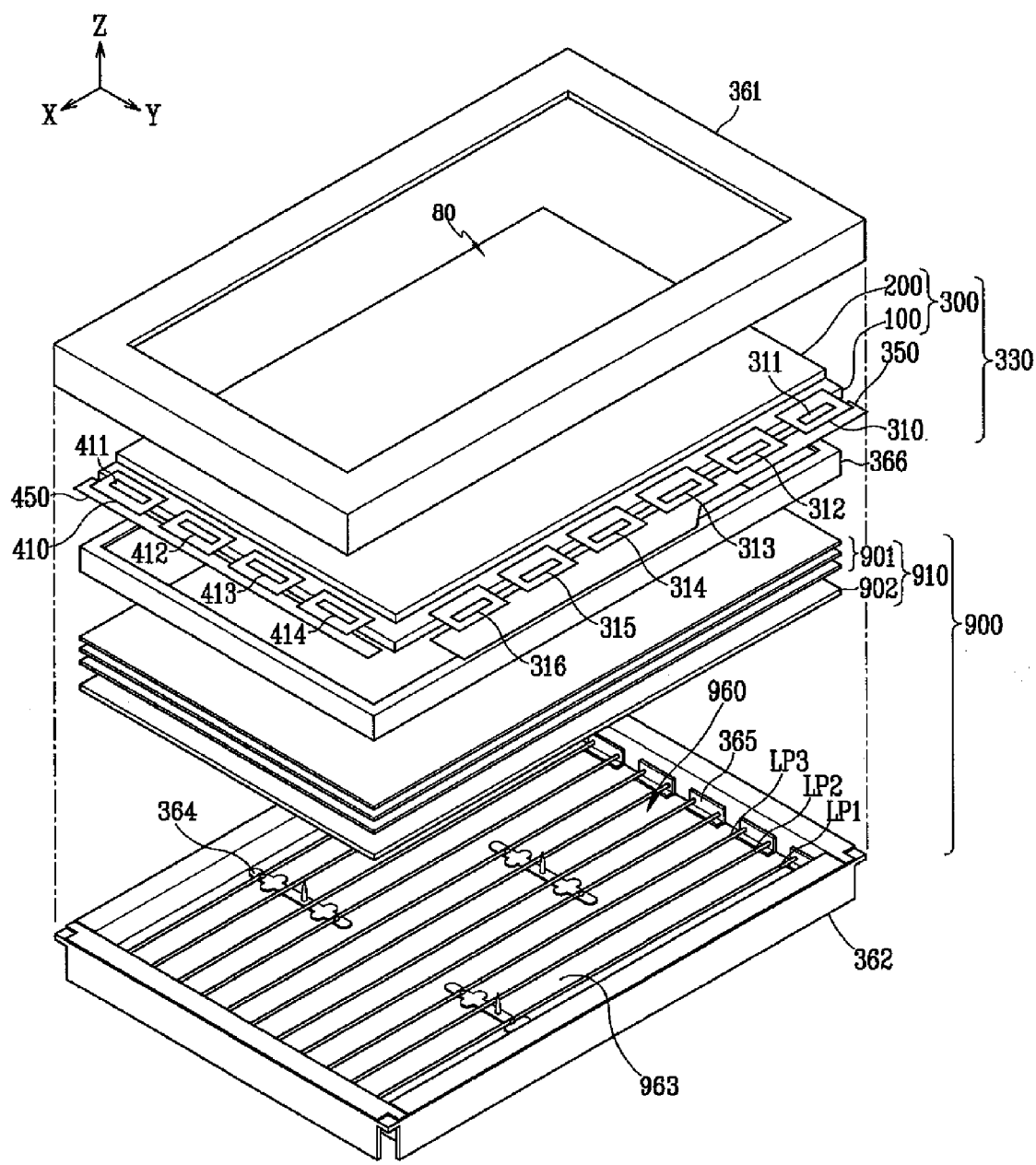
FIG. 1 is a prospective view of a liquid crystal display (LCD) device in accordance with exemplary embodiments.
Figure 2:
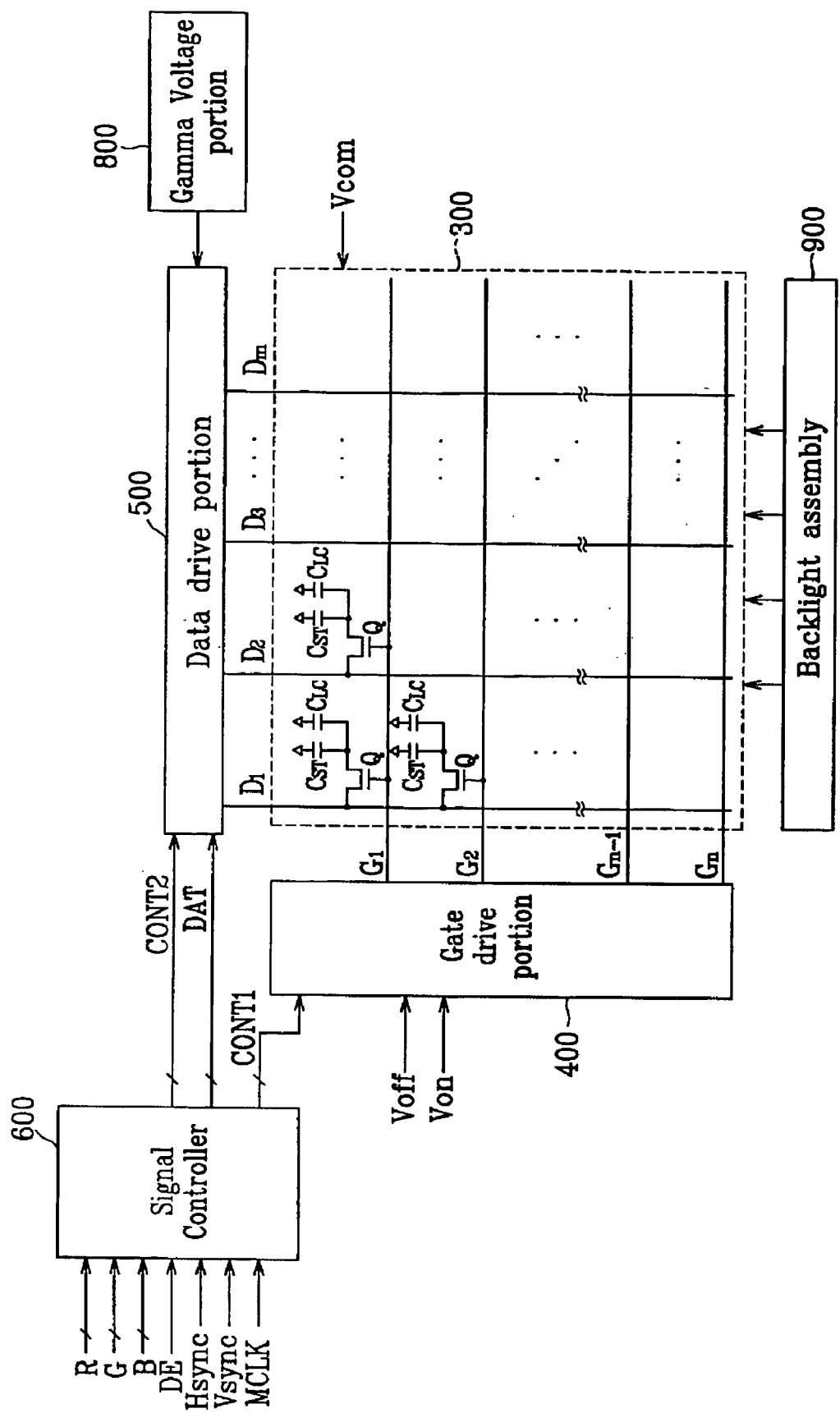
FIG. 2 is a block diagram of the LCD device of FIG. 1 in accordance with exemplary embodiments.
Figure 3:
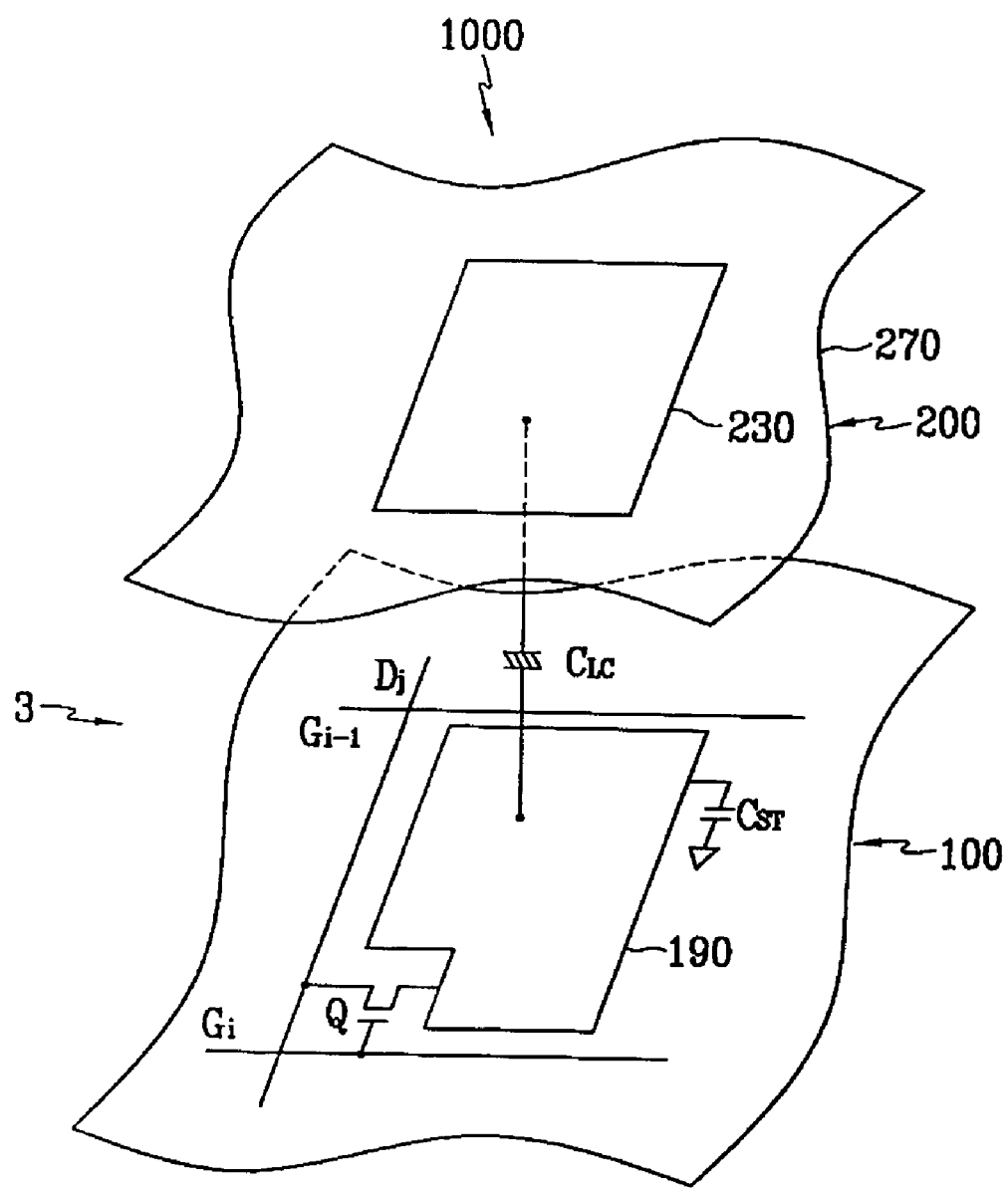
FIG. 3 is an equivalent circuit diagram for a pixel in the LCD device of FIG. 2 in accordance with exemplary embodiments.
Figure 4:
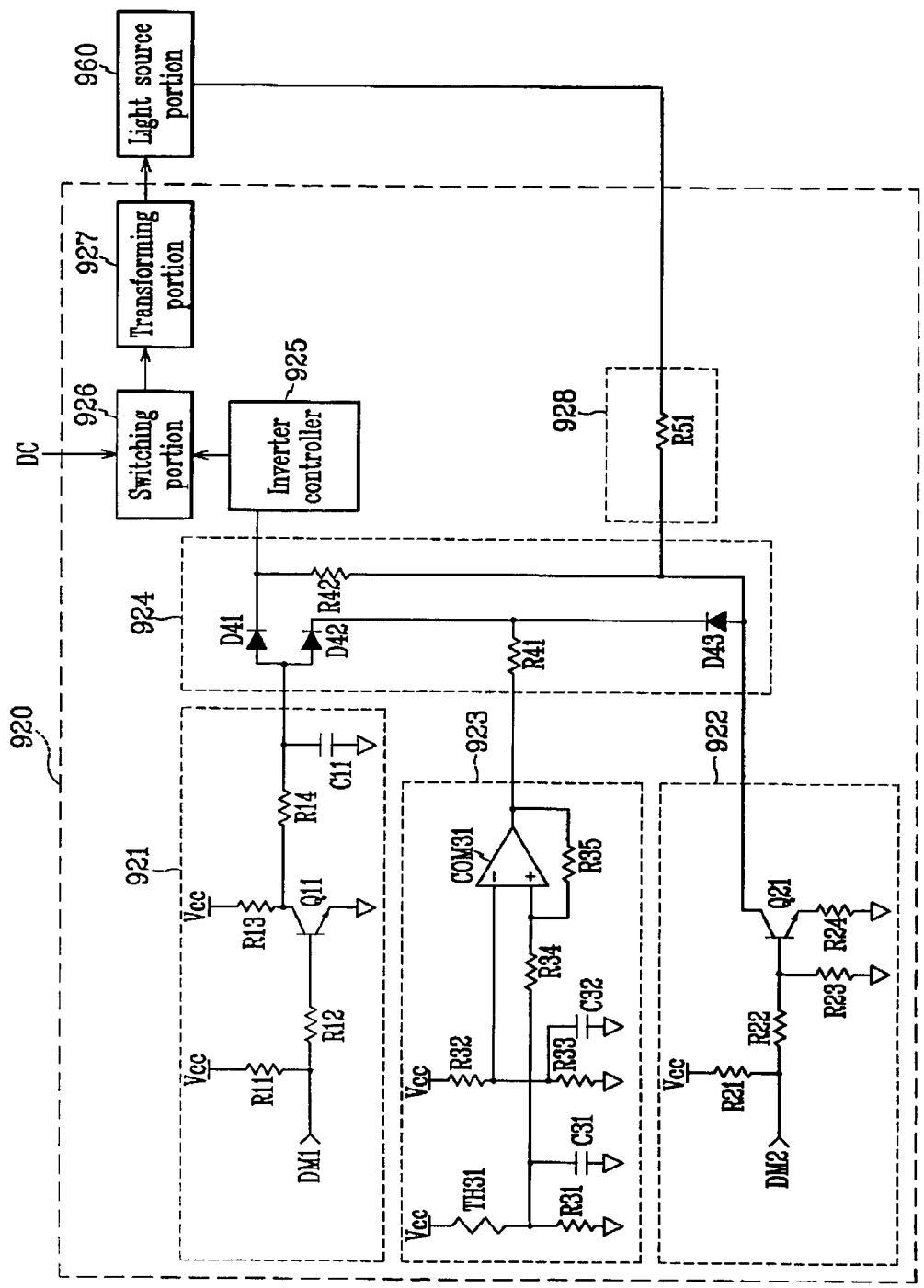
FIG. 4 is a circuit diagram of an inverter portion of FIG. 1 in accordance with exemplary embodiments.

FIG. 1 is a prospective view of a liquid crystal display (LCD) device in accordance with exemplary embodiments; FIG. 2 is a block diagram of the LCD device of FIG. 1 in accordance with exemplary embodiments; FIG. 3 is an equivalent circuit diagram for a pixel in the LCD device of FIG. 2 in accordance with exemplary embodiments; and FIG. 4 is a circuit diagram of an inverter portion of FIG. 1 in accordance with exemplary embodiments.

Turning now to FIG. 1, a liquid crystal display (LCD) device comprises a display portion 330, a backlight assembly 900, upper and lower chassises 361, 362, respectively, and a mold frame 366. The display portion 330 comprises an LCD assembly 300, multiple data and gate tape carrier packages (TCPs) 310, 410, respectively, that are attached to the LCD assembly 300, and data and gate printed circuit boards (PCBs) 350, 450, respectively, attached to the corresponding data and gate TCPs 310, 410. With reference to FIG. 3, the LCD assembly 300 comprises lower and upper display substrates 100, 200, respectively, and a liquid crystal layer 3 disposed between the lower and upper display substrates 100, 200. The lower display substrate 100 comprises multiple display signal lines (e.g., gate and data lines $G_1$-$G_n$, $D_1$-$D_m$).

Also shown in FIG. 3, a pixel 1000 in the LCD device comprises a switching element Q connected to each of the gate lines $G_1$-$G_n$ and each of data lines $D_1$-$D_m$, a liquid crystal capacitor $C_{lc}$, and optionally a storage capacitor $C_{st}$. Multiple switching elements Q are formed on the lower display substrate 100 and each of the multiple switching elements Q has three terminals (e.g., gate, drain, and source electrodes). The liquid crystal capacitor $C_{lc}$ represents a capacitor that the liquid crystal layer 3 is disposed between a pixel electrode 190 and a common electrode 270. The common electrode 270 is formed on an upper substrate 200, but may be formed on the lower display substrate 100. The storage capacitor $C_{st}$ represents a capacitor where a separate signal line (not shown) formed on the lower display substrate 100 overlaps the pixel electrode 190. Further, the storage capacitor $C_{st}$ may form a capacitor where the pixel electrode 190 overlaps a previous gate line. A polarizer (not shown) may be attached to one surface of at least one lower and upper display substrates 100, 200. A color filter 230 comprises red, blue, and green filters and faces the lower display substrate 100. Further, the color filter 230 may be formed on the lower display substrate 100. In exemplary embodiments, the LCD device comprises multiple pixels 1000.

Turning back to FIG. 1, the gate TCPs 410 are attached to one or both edges of the lower display substrate 100 and have gate driving integrated circuits (gate ICs) 411 to 414 mounted thereon. The data TCPs 310 are attached to one or both edges of the lower display substrate 100 and have data driving integrated circuits (data ICs) 311 to 316 mounted thereon. The gate PCB 450 are attached to the gate TCPs 410 parallel to the lower display substrate 100 and the data PCB 350 are attached to the data TCPs 310 parallel to the lower display substrate 100. The gamma voltage portion 800 includes two groups of gamma voltages, such as one group has higher voltages and another group has lower voltages than a common voltage, for example. The number of the gamma voltages provided may be adjustable based on the resolution of the LCD device.

Turning now to FIG. 2, gate and data drive portions 400, 500, respectively, are electrically connected to the gate and data lines $G_1$-$G_n$, $D_1$-$D_m$ of the LCD assembly 300 over signal lines (not shown) formed on the data and gate TCPs 310, 410 of FIG. 1. The gate drive portion 400 applies gate ON/OFF signals being a combination of Von and Voff signals to the gate lines $G_1$-$G_n$ and the data drive portion 500 applies data signals DAT to the data lines $D_1$-$D_m$. The data and gate ICs 311 to 316, 411 to 414 may be mounted on the lower display substrate 100, and may be also formed on the lower display substrate 100 using, e.g., TFT processes without having to mount the data and gate ICs 311 to 316, 411 to 414.

Turning now to FIG. 4, a circuit diagram of an inverter portion of the LCD device of FIG. 1 will now be described. The backlight assembly 900 comprises a light source portion 960 mounted in the lower chassis 362, an optical portion 910 disposed between the LCD assembly 300 and the light source portion 960 that adjusts light emitted from the light source portion 960. The inverter portion 920 controls the operation of the light source portion 960.

The light source portion 960 comprises multiple lamps (LPs) such as fluorescent lamps, for example, multiple lamp holders 365 affixing the multiple LPs at both edges of the lower chassis 362, multiple lamp supporters 364, a reflect sheet 363 mounted under the multiple LPs and reflecting light from the multiple LPs toward the LCD assembly 300. In exemplary embodiments, the multiple LPs may comprise cold cathode fluorescent lamps (CCFLs), external electrode fluorescent lamps (EEFLs), light emitting diodes (LEDs), and a planar surface light source, for example. The number of the multiple LPs is not limited, but may be increased and reduced based on the size of the LCD device.

As shown in FIG. 4, the inverter portion 920 comprises a first brightness control portion 921, a second brightness control portion 922, a temperature sensor 923, a signal output portion 924 connected to the first and second brightness control portions 921, 922 and the temperature sensor 923, an inverter controller 925 connected to the signal output portion 924, a switching portion 926 connected to the inverter controller 925, a transforming portion 927 connected to the switching portion 926 and the light source portion 960, and an electric current sensor 928 connected to the signal output portion 924. The inverter portion 920 may be mounted on an inverter PCB (not shown) and on the data and gate PCB 350, 450. In this embodiment, the temperature sensor 923 is mounted on the inverter portion 920; however, it will be understood that the temperature sensor 923 may be mounted on other suitable devices.

Turning back to FIG. 1, the optical portion 910 is disposed between the LCD assembly 300 and the light source portion 960 and comprises multiple optical sheets 901 and a diffusing sheet 902 diffusing light from the light source portion 960 toward the LCD assembly 300. As shown in FIG. 1, the multiple LPs of the light source portion 960 are mounted under the lower display substrate 100; however, it will be understood that the multiple LPs may be mounted at one or both edges of the LCD assembly 300. When the multiple LPs of the light source portion 960 are mounted at one or both edges of the LCD assembly 300, a light guide sheet (not shown) may be used instead of the diffusing sheet 902. Further, upper and lower cases (not shown) may be mounted at the upper portion of the upper chassis 361 and the lower portion of the lower chassis 362, respectively.

Operation of the LCD device will be now described in detail with reference to the accompanying drawings.

With reference to FIG. 2, a signal controller 600 controls the operation of the gate and data drive portions 400, 500. The signal controller 600 receives input control signals (Vsync, Hsync, Mclk, DE) from an external source (e.g. a graphic controller)(not shown) and input image signals (R, G, B) and generates image signals (R', G', B'), gate control signals CONT1, and data control signals CONT2 with respect to the input control signals (Vsync, Hsync, Mclk, DE) and the input image signals (R', G', B'). Further, the signal controller 600 sends the gate control signals CONT1 to the gate drive portion 400 and the data control signals CONT2 to the data drive portion 500. The gate control signals CONT1 include STV indicating start of one frame, CPV controlling an output timing of the gate on signal, OE indicating an ending time of one horizontal line, etc. The data control signals CONT2 include STH indicating start of one horizontal line, TP or LOAD instructing an output of data voltages, RVS or POL instructing polarity reverse of data voltages with respect to a common voltage, etc.

The data drive portion 500 receives the image signals (R', G', B') from the signal controller 600 and outputs the data voltages by selecting gamma voltages corresponding to the image signals (R', G', B') according to the data control signals CONT2. The gate drive portion 400 applies the gate on signal according to the gate control signals CONT1 to the gate lines and turns on the switching elements Q connected to the gate lines.

The gate driving portion 400 applies the gate-on voltage Von to the gate lines $G_1$-$G_n$ according to the gate control signals CONT1 from the signal controller 600 and turns on the switching elements Q connected to the gate lines $G_1$-$G_n$. The image data voltages applied to the data lines $D_1$-$D_m$ are then applied to the corresponding pixels as the switching elements Q are turned on.

With reference to FIG. 4, the inverter portion 920 converts DC voltages applied from an external source into AC voltages and applies the AC voltages to the light source portion 960. The inverter portion 920 turns on and off the light source portion 960 and controls the brightness of the light source portion 960. Additionally, the inverter portion 920 controls the operation of the light source portion 960 based on temperature sense signals applied from the temperature sensor 923.

E of the inverter portion 920 will be now described with reference to FIG. 4.

The first brightness control portion 921 comprises a resistor R11 connected to a power supply $V_{cc}$, a resistor R12 commonly connected to the resistor R11 and an input terminal of the first brightness control signal DM1, a resistor R13 connected to the power supply $V_{cc}$, a transistor Q11, a resistor R14 connected to a collector terminal of the transistor Q11, and a capacitor C11 disposed between the resistor R14 and a ground. A base terminal of the transistor Q11 is connected to the resistor R12, and an emitter terminal of the transistor Q11 is connected to the ground.

The second brightness control portion 922 comprises a resistor R21 connected to the power supply $V_{cc}$, a resistor R22 commonly connected to the resistor R21 and an input terminal of the second brightness control signal DM2, a resistor R23 disposed between the resistor R22 and the ground, a transistor Q21 having the base terminal connected to the resistor R22, and a resistor R24 disposed between an emitter terminal of the transistor Q21 and the ground.

The temperature sensor 923 comprises a temperature sensing part TH31 and a resistor R31 in series disposed between the power supply $V_{cc}$ and the ground, a capacitor C31 disposed between the ground and the common terminal of the temperature sensing part TH31 and the resistor R31, resistors R32, R33 in series disposed between the power supply $V_{cc}$ and the ground, a capacitor C32 disposed between the common terminal of the resistors R32, R33 and the ground, a resistor R34 connected to the common terminal of the temperature sensing part TH31 and the resistor R31, an operational amplifier (OP-AMP) COM31 that a negative terminal (−) is connected to the common terminal of the resistors R32, R33 and a positive terminal (+) is connected to the resistor R34, and a resistor R35 disposed between the positive terminal (+) and the output terminal of the OP-AMP COM31.

The signal output portion 924 comprises diodes D41, D42 forwardly connected to the capacitor C11 of the first brightness control portion 921, diode D43 forwardly connected to a collector terminal of the transistor Q21 of the second brightness control portion 922, and a resistor R41 connected to the output terminal of the OP-AMP COM31 of the temperature sensor 923 and the diodes D42, D43.

The electric current sensor 928 comprises a resistor R51 connected to the light source portion 960 and the resistor R42 of the signal output portion 924.

The temperature sensing part TH31 of the temperature sensor 923 comprises a thermistor that is a temperature sensing element having varying resistance based on a sensed temperature, for example. In exemplary embodiments, the resistance of the thermistor used as the temperature sensing part TH31 is reduced as the sensed temperature increases. Conversely, the resistance of the thermistor used as the temperature sensing part TH31 is increased as the sensed temperature is reduced. The temperature sensing part TH31 may be mounted on the multiple LPs of the light source portion 960 or a certain position representing a temperature substantially similar to the multiple LPs. However, the operation or the position of the temperature sensing part TH31 may vary based on the characteristics of the LCD device.

According to this configuration, the inverter portion 920 may control an electric current of the multiple LPs of the light source portion 960 based on the sensed temperature from the temperature sensing part TH31 and prevent reduction of the brightness of the multiple LPs caused by reduction of the temperature.

Operation of the inverter portion 920 will be now described in detail with reference to FIG. 4.

A triangular wave of the initial frequency applied from an external source (e.g., an oscillating portion)(not shown) is generated, and a pulse width modulation (PWM) signal based on an initial DC level of a control signal applied from an external source (not shown) is then applied to the first brightness control portion 921 as a first brightness control signal DM1.

In exemplary embodiments, a high level of the first brightness control signal DM1 refers to a Turn-On period of the multiple LPs of the light source portion 960 and a low level of the first brightness control signal DM1 refers to a Turn-Off period of the multiple LPs of the light source portion 960. The first brightness control signal DM1 may change a duty ratio of the control signal as a user adjusts the DC level of the control signal applied from the external source (not shown) using a control switch (not shown), for example, and thus change the Turn-On and Turn-Off cycle of the light source portion 960.

The first brightness control portion 921 applies the first brightness control signal DM1 to the transistor Q11 through the resistor R12. The transistor Q11 is turned on or off based on the first brightness control signal DM1, and an inverted phase signal with respect to the first brightness control signal DM1 is applied to the signal output portion 924 through the resistor R14 and the capacitor C11. The resistor R11 may be, e.g., a pull-up resistor.

The second brightness control portion 922 adjusts the second brightness control signal DM2 to a desired level using the resistors R22, R23, and applies the adjusted level of the second brightness control signal DM2 to the transistor Q21. The second brightness control signal DM2 is a desired DC level of signal and may adjust the desired DC level of the signal based on brightness of the light source portion 960. In exemplary embodiments, the transistor Q21 and the resistor R24 operate as an emitter follower.

According to this configuration, a voltage of the emitter terminal of the transistor Q21 is set by the second brightness control signal DM2, and when the transistor Q21 operates, an electric current applied to the collector terminal of the transistor Q21 flows into the ground through the resistor R24. The resistor R21 may be, e.g., a pull-up resistor.

When the first and second brightness control portions 921, 922 operate in response to the first and second brightness control signals DM1, DM2, the temperature sensor 923 operates based on the temperature sensed by the temperature sensing part TH31. For example, if the resistance of the temperature sensing part TH31 based on the sensed temperature is set, the power supply $V_{cc}$ is divided by the temperature sensing part TH31 and the resistor R31 to a corresponding voltage level, and the divided voltage level is then applied to the positive terminal (+) of the OP-AMP COM31 through the resistor R34. Further, the power supply $V_{cc}$ is divided by the resistors R32, R33 to a corresponding voltage level and the divided voltage level is then applied to the negative terminal (−) of the OP-AMP COM31 through the resistor R34. The OP-AMP COM31 operates as a comparator and the divided voltage by the resistors R32, R33 is used as a reference voltage of the OP-AMP COM31.

According to this configuration, a voltage level at an output terminal of the OP-AMP COM31 is set based on the magnitude of the voltages applied to the negative (−) and positive (+) terminals of the OP-AMP COM31. For example, when a surrounding temperature of the temperature sensing part TH31 is less than the predetermined temperature, the voltage applied to the positive terminal (+) of the OP-AMP COM31 receives less than the reference voltage applied to the negative terminal (−) of the OP-AMP COM31. Therefore, the output voltage of the OP-AMP COM31 becomes a low level of voltage.

The resistor R34 comprises adjusting difference of the signals caused by difference of the resistances between the temperature sensing part TH31 and the resistor R31 and difference of the -resistances between the resistors R32, R33. The OP-AMP COM31 may have characteristics of hysteresis by the resistor R35. Therefore, since a switching point of the output voltage of the OP-AMP COM31 from a high level to a low level and from a low level to a high level is not the same, the OP-AMP COM31 may reduce noise caused by frequent variation of the signals.

Although the predetermined temperature is about −10° C. that cannot operate normally, in the embodiment, the predetermined temperature may be adjustable based on the operational characteristics of the multiple LPs or the surrounding circumstance of the LCD device.

As described the above, when the signal output from the OP-AMP COM31 is a low level, the output signal applied from the first brightness control portion 921 to the signal output portion 924 is delivered to the resistor R35 of the temperature sensor 923 through the resistor R14 and the diode D42, and thus a low level of the signal is applied to the inverter controller 925. Therefore, the inverter controller 925 turns on or turns off the light source portion 960 based on a feedback signal applied from the electric current sensor 928.

The inverter controller 925 generates the control signal of a desired frequency for an initial operation of the light source portion 960 and applies the control signal of the desired frequency to the switching portion 926. The control signal generated from the inverter controller 925 may apply a maximum driving voltage to the light source portion 960.

The switching portion 926 responds to the control signal applied from the inverter controller 925 by converting a DC voltage from an external source (not shown) into an AC voltage and applying the AC voltage to the transforming portion 927.

The transforming portion 927 ramps up the AC voltage applied from the switching portion 923 to a higher voltage based on a winding ratio and applies the ramped-up voltage to the light source portion 960, thus, the multiple LPs of the light source portion 960 are turned on.

When the light source portion 960 is turned on, the electric current sensor 928 applies a voltage proportional to the electric current of the multiple LPs of the light source portion 960 using the resistor R41 to the signal output portion 924. The voltage applied from the electric current sensor 928 is delivered to the resistor R24 through the transistor Q21 of the second brightness control portion 922. Since the output voltage of the OP-AMP COM31 is a low level, the voltage applied from the electric current sensor 928 is delivered to the temperature sensor 923 through the diode D43 and the resistor R41 of the signal output portion 924, and the voltage applied from the temperature sensor 923 is delivered to the inverter controller 925 through the resistor R42.

In exemplary embodiments, the inverter controller 925 adjusts a driving voltage to be applied to the light source portion 960 based on a control signal of the electric current sensor 928 caused by the feedback through the resistor R42, and makes the electric current of the multiple LPs of the light source portion 960 uniform.

As described the above, since the output voltage of the OP-AMP COM31 of the temperature sensor 923 is a low level, the voltage of the control signal output from the electric current sensor 928 is delivered to the temperature sensor 923, as well as the inverter controller 925 and the second brightness control portion 922. Therefore, the voltage of the control signal applied to the inverter controller 925 is reduced by a voltage divided by the resistor R42. To compensate for the reduced voltage, the inverter controller 925 increases the driving voltage for the light source portion 960.

Further, when the sensed temperature by the temperature sensing part TH31 is less than the predetermined temperature of the LCD device, the voltage of the control signal applied to the inverter controller 925 becomes a low level through the diode D41 and the voltage of the control signal caused by the feedback through the resistor R42 is lowered. Amounts of the electric current of the light source portion 960 may be increased by increasing the driving voltage for the light source portion 960 while continuously turning on the light source portion 960.

However, when a surrounding temperature of the temperature sensing part TH31 of the temperature sensor 923 is more than the predetermined temperature of the LCD device, the voltage applied to the positive terminal (+) of the OP-AMP COM31 through the temperature sensing part TH31 and the resistor R31 becomes more than the reference voltage of the OP-AMP COM31 and thus the OP-AMP COM31 outputs a voltage higher than the reference voltage. Therefore, the output signal applied from the first brightness control portion 921 is inverted through the diode D41 of the signal output portion 924, and the inverted output signal is applied to the inverter controller 925.

Further, the voltage applied from the electric current sensor 928 is delivered to the resistor R24 through the transistor Q21 of the second brightness control portion 922 and applied to the inverter controller 925 through the resistor R42. The inverter controller 925 controls operation of the switching portion 926 for making amounts of the electric current of the multiple LPs of the light source portion 960 uniform during a high level of the first brightness control signal DM1. In this way, when the surrounding temperature of the temperature sensing part TH31 is more than the predetermined temperature of the LCD device, the inverter controller 925 turns on or turns off the light source portion 960 based on the first brightness control signal DM1 and the feedback signal applied from the electric current sensor 928.

Varying electric currents, varying temperatures, and varying brightness of the multiple LPs of the light source portion 960 with respect to varying times will be now described with reference to FIGS. 5A to 5C.

Figure 5A:
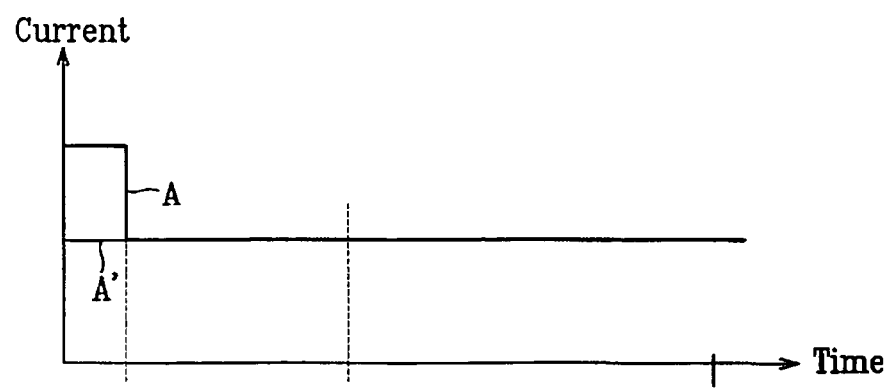
FIG. 5A is a graphical view of results of comparing a conventional light source portion and the light source portion of FIG. 4 based on varying electric currents applied and with respect to varying times in accordance with exemplary embodiments.

FIG. 5A is a graphical view of results of comparing a conventional light source portion and the light source portion of FIG. 4 based on varying electric currents applied and with respect to varying times; FIG. 5B is a graphical view of results of comparing a conventional light source portion and the light source portion of FIG. 4 based on varying temperatures associated therewith and with respect to varying times; and FIG. 5C is a graphical view of results of comparing a conventional light source portion and the light source portion of FIG. 4 based on varying levels of brightness and with respect to varying times.

Turning now to FIG. 5A, the electric current of the multiple LPs of the light source portion 960 is ramped up and is maintained, e.g., at a maximum of electric current ("A") until the surrounding temperature of the light source portion 960 becomes more than the predetermined temperature of the LCD device. However, the conventional multiple LPs maintain a constant electric current ("A'") regardless of the varying times.

Figure 5B:
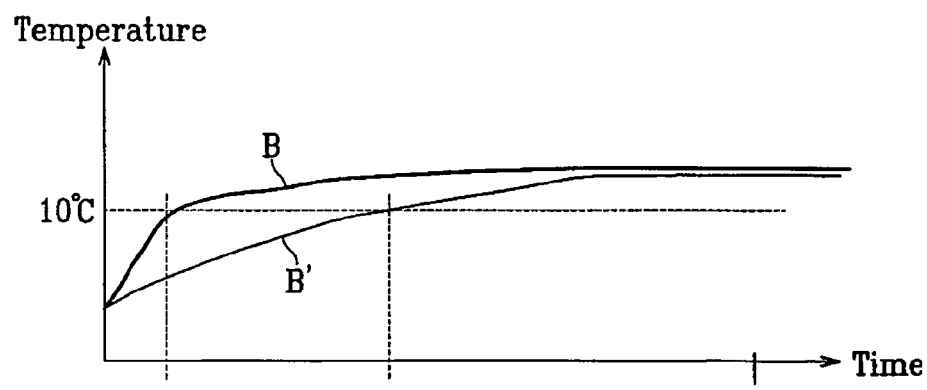
FIG. 5B is a graphical view of results of comparing a conventional light source portion and the light source portion of FIG. 4 based on varying temperatures associated therewith and with respect to varying times in accordance with exemplary embodiments.
Figure 5C:
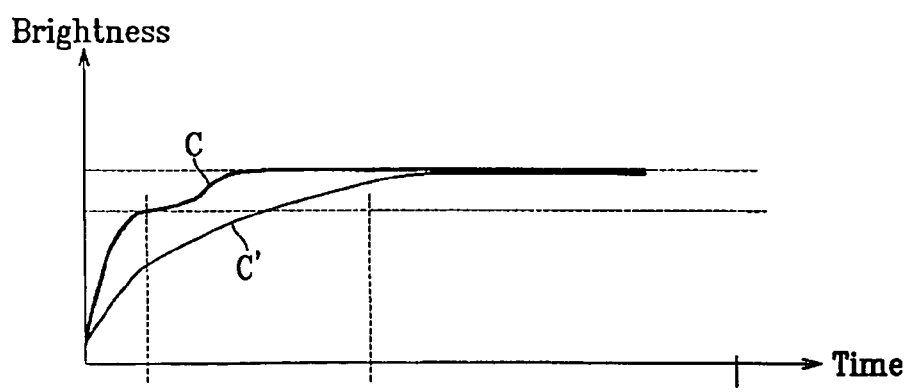
FIG. 5C is a graphical view of results of comparing a conventional light source portion and the light source portion of FIG. 4 based on varying levels of brightness and with respect to varying times in accordance with exemplary embodiments.

Turning now to FIG. 5B, the time ("B") in which an operational temperature (e.g., 10° C.) of the multiple LPs of the light source portion 960 is reached is faster than that of the conventional multiple LPs ("B'"). As described the above, since the surrounding temperature of the multiple LPs of the light source portion 960 quickly reaches the operational temperature of the LCD device, as shown in FIG. 5C, the time ("C"), the desired brightness level of the light source portion 960 is reached more quickly than that of the conventional multiple LPs ("C'").

According to the exemplary embodiments of the present invention, if the surrounding temperature of the light source portion is less than the predetermined temperature of the LCD device, the driving voltage applied to the light source portion becomes a maximum of voltage and thus a maximum of electric current is applied to the multiple LPs of the light source portion. As a result, the time for which the surrounding temperature of the light source portion reaches an operational temperature may be shortened, thus, preventing any reduction of the brightness of the light source portion caused by malfunctional operation of the discharging gases. Additionally, if the light source portion operates at the predetermined temperature of the LCD device, erosion of the electrodes of the multiple LPs caused by the discharging gases may be prevented and reduction of the life span of the light source portion may be prevented.

Having described the embodiments of the present invention and its advantages, it should be noted that various changes, substitutions and alterations can be made herein without departing from the spirit and scope of the invention as defined by appended claims.

What is claimed is:

1. A driving device for at least one light source, comprising:
   a temperature sensor operable for sensing a surrounding temperature of the light source and outputting a first control signal in response to the sensed temperature;
   a signal output portion operable for receiving a second control signal based on a first brightness control signal applied from an external source; changing the second control signal based on the first control signal; and outputting the changed second control signal; and
   an inverter controller operable for receiving the changed second control signal and outputting a third control signal based on the changed second control signal, wherein the first control signal becomes a low level when the surrounding temperature of the light source is less than a predetermined temperature of the light source, and the second and third control signals are adjusted based on the first control signal, and
   the second control signal becomes a low level when the first control signal is a low level, and the third control signal is ramped up to a high level for driving the at least one light source.

2. The driving device for the at least one light source of claim 1, wherein the temperature sensor comprises:
   a temperature sensing part connected to the power supply;
   a first resistor disposed between the temperature sensing part and the ground;
   a first capacitor disposed between the ground and the common terminal of the temperature sensing part and the first resistor;
   second and third resistors in series disposed between the power supply and the ground;
   a second capacitor disposed between the common terminal of the second and third resistors and the ground;
   a fourth resistor connected to the common terminal of the temperature sensing part and the first resistor;
   an operational amplifier that a negative terminal is connected to the common terminal of the second and third resistors and a positive terminal is connected to the fourth resistor; and
   a fifth resistor disposed between the positive terminal and an output terminal of the operational amplifier.

3. The driving device for the at least one light source of claim 2, wherein the temperature sensing part is a thermistor and the operational amplifier is a comparator.

4. The driving device for the at least one light source of claim 3, wherein the operational amplifier has hysteresis characteristics.

5. The driving device for the at least one light source of claim 2, further comprising:
   a first brightness control portion operable for outputting the second control signal based on the first brightness control signal; and
   a second brightness control portion operable for generating an output signal based on a second brightness control signal.

6. The driving device for the at least one light source of claim 5, wherein the first brightness control portion comprises:
- a sixth resistor connected to a power supply;
- a seventh resistor connected to the sixth resistor and an input terminal of the first brightness control signal;
- an eighth resistor connected to the power supply;
- a ninth resistor connected to a collector terminal of a transistor;
- a transistor, the transistor having a base terminal connected to the seventh resistor, an emitter terminal connected to a ground, and a collector terminal connected to the ninth resistor; and
- a capacitor disposed between the ninth resistor and the ground.

7. The driving device for the at least one light source of claim 6, wherein the first brightness control signal is a pulse width modulation (PWM) signal.

8. The driving device for the at least one light source of claim 7, wherein the second brightness control portion comprises:
- a tenth resistor connected to a power supply;
- an eleventh resistor connected to the tenth resistor and an input terminal of the second brightness control signal;
- a twelfth resistor disposed between the eleventh resistor and a ground;
- a transistor having a base terminal connected to the eleventh resistor and a collector terminal connected to the signal output portion; and
- a thirteenth resistor disposed between an emitter terminal of the transistor and the ground.

9. The driving device for the at least one light source of claim 8, further comprising:
- a switching portion operable for operating based on the third control signal; converting a DC voltage applied from an external device into an AC voltage; and outputting the AC voltage;
- a transforming portion operable for ramping up the AC voltage to a higher voltage and outputting the higher voltage;
- a light source portion operable for receiving the higher voltage and for turning on or turning off at least one light source based on the higher voltage; and
- an electric current sensor operable for sensing an electric current of the at least one light source and for outputting a corresponding voltage in response to the sensed electric current.

10. The driving device for the at least one light source of claim 9, wherein the electric current sensor comprises a resistor connected to the signal output portion.

11. A driving device for at least one light source, comprising:
- a temperature sensor, the temperature sensor operable for sensing a surrounding temperature of the light source and outputting a first control signal in response to the sensed temperature;
- a first brightness control portion, the first brightness control portion operable for outputting a second control signal based on a first brightness control signal applied from an external source;
- a signal output portion, the signal output portion operable for receiving the second control signal based on the first brightness control signal; changing the second control signal based on the first control signal; and outputting the changed second control signal;
- an inverter controller, the inverter controller operable for receiving the changed second control signal and outputting a third control signal based on the changed second control signal;
- a second brightness control portion, the second brightness control portion operable for generating an output signal based on a second brightness control signal; and
- an electric current sensor operable for sensing an electric current of at least one light source and outputting a corresponding voltage in response to the sensed electric current.

12. The driving device for the at least one light source of claim 11, wherein the first control signal becomes a low level when the surrounding temperature of the light source is less than a predetermined temperature of the light source, and the second and third control signals are adjusted based on the first control signal.

13. The driving device for the at least one light source of claim 12, wherein the second control signal becomes a low level when the first control signal is a low level, and the third control signal is ramped up to a high level for driving the light source.

14. A display device, comprising:
- a display portion, the display portion comprising a display assembly, multiple data and gate tape carrier packages (TCPs) attached to the display assembly, and data and gate printed circuit boards attached to the corresponding data and gate TCPs; and
- a backlight assembly, the backlight assembly comprising a light source portion having at least one light source, an optical portion disposed between the display assembly and the light source portion for adjusting amount of light from the light source portion, and an inverter portion operable for controlling operation of the light source portion;

wherein the inverter portion comprises:
- a temperature sensor operable for sensing a surrounding temperature of the light source and outputting a first control signal in response to the sensed temperature;
- a signal output portion operable for receiving a second control signal based on a first brightness control signal applied from an external source; changing the second control signal based on the first control signal; and outputting the changed second control signal; and
- an inverter controller operable for receiving the changed second control signal and outputting a third control signal based on the changed second control signal, wherein the first control signal becomes a low level when the surrounding temperature of the light source is less than a predetermined temperature of the light source, and the second and third control signals are adjusted based on the first control signal, and the second control signal becomes a low level when the first control signal is a low level, and the third control signal is ramped up to a high level for driving the at least one light source.

15. The display device of claim 14, wherein the temperature sensor comprises:
- a temperature sensing part connected the power supply;
- a first resistor disposed between the temperature sensing part and the ground;
- a first capacitor disposed between the ground and the common terminal of the temperature sensing part and the first resistor;

second and third resistors in series disposed between the power supply and the ground;

a second capacitor disposed between the common terminal of the second and third resistors and the ground;

a fourth resistor connected to the common terminal of the temperature sensing part and the first resistor;

an operational amplifier that a negative terminal is connected to the common terminal of the second and third resistors and a positive terminal is connected to the fourth resistor; and a fifth resistor disposed between the positive terminal and an output terminal of the operational amplifier.

16. The display device of claim 15, wherein the temperature sensing part is a thermistor and the operational amplifier is a comparator.

17. The display device of claim 16, wherein the operational amplifier has hysteresis characteristics.

18. The display device of claim 17, further comprising:

a first brightness control portion operable for outputting the second control signal based on the first brightness control signal; and a second brightness control portion operable for generating an output signal based on a second brightness control signal.

19. The driving device for the at least one light source of claim 8, wherein the signal output portion comprises:

first and second diodes forwardly connected to the capacitor of the first brightness control portion;

a third diode forwardly connected to a collector terminal of the transistor of the second brightness control portion; and a fourteenth resistor connected to between output terminal of the operational amplifier of the temperature sensor and the common terminal of the second and third diodes.

* * * * *